US011479480B2

(12) United States Patent
Palko et al.

(10) Patent No.: US 11,479,480 B2
(45) Date of Patent: Oct. 25, 2022

(54) IMMISCIBLE LIQUID MEDIATED HUMIDIFICATION / DEHUMIDIFICATION SYSTEMS AND METHODS

(71) Applicant: The Regents of the University of California, Oakland, CA (US)

(72) Inventors: James Palko, Merced, CA (US); Ali Hassanzadeh, Merced, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/290,184

(22) PCT Filed: Oct. 31, 2019

(86) PCT No.: PCT/US2019/059264
§ 371 (c)(1),
(2) Date: Apr. 29, 2021

(87) PCT Pub. No.: WO2020/092842
PCT Pub. Date: May 7, 2020

(65) Prior Publication Data
US 2022/0073373 A1    Mar. 10, 2022

Related U.S. Application Data

(60) Provisional application No. 62/753,817, filed on Oct. 31, 2018.

(51) Int. Cl.
*C02F 1/10* (2006.01)
*B01D 1/00* (2006.01)
(Continued)

(52) U.S. Cl.
CPC .............. *C02F 1/10* (2013.01); *B01D 1/0047* (2013.01); *B01D 1/14* (2013.01); *B01D 5/006* (2013.01);
(Continued)

(58) Field of Classification Search
CPC .. C02F 1/043; C02F 1/048; C02F 1/08; C02F 1/10; C02F 1/14; C02F 2103/08;
(Continued)

(56) References Cited

U.S. PATENT DOCUMENTS 3,288,686 A * 11/1966 Othmer ................... C02F 1/04
203/88
3,305,456 A * 2/1967 Broughton ............... D06L 4/26
203/52

(Continued)

*Primary Examiner* — Jonathan Miller
(74) *Attorney, Agent, or Firm* — Coleman & Horowitt, LLP; Sherrie M. Flynn (57) ABSTRACT

Apparatuses for removal of solids from water comprising a heater for heating an immiscible liquid (IL), a humidifier having porous sheets allowing direct contact between the IL and water, thereby separating the solids by evaporating the water into cool dry air flowing past the porous sheets, and a dehumidifier comprising porous sheets that allow direct contact between the cool IL and hot moist air flowing past the porous sheets, thereby condensing fresh water from the moist air. Also disclosed are methods for removal of solids from water by heating an IL, distributing the IL to porous sheets in a humidifier, distributing water with dissolved solids to the porous sheets, separating the solids from the water by evaporating the water into dry air flowing past the porous sheets, and condensing fresh water by flowing the moist air past porous sheets in a dehumidifier having cool IL distributed to the porous sheets.

20 Claims, 9 Drawing Sheets

(51) Int. Cl.
  *B01D 1/14* (2006.01)
  *B01D 5/00* (2006.01)
  *C02F 1/04* (2006.01)
  *C02F 1/08* (2006.01)
  *C02F 1/14* (2006.01)
  *C02F 103/08* (2006.01)

(52) U.S. Cl.
  CPC ............ *B01D 5/0027* (2013.01); *C02F 1/043* (2013.01); *C02F 1/048* (2013.01); *C02F 1/08* (2013.01); *C02F 1/14* (2013.01); *C02F 2103/08* (2013.01); *C02F 2209/38* (2013.01); *C02F 2209/40* (2013.01); *C02F 2301/046* (2013.01); *C02F 2303/10* (2013.01)

(58) Field of Classification Search
  CPC .............. C02F 2209/38; C02F 2209/40; C02F 2301/046; C02F 2303/10; B01D 1/0047; B01D 1/14; B01D 5/0027; B01D 5/006
  See application file for complete search history.

(56) References Cited

U.S. PATENT DOCUMENTS

| | | | | |
|---|---|---|---|---|
| 3,411,992 | A * | 11/1968 | Mitchell | C02F 1/10 202/185.2 |
| 3,986,938 | A * | 10/1976 | Smith, Jr. | B01D 1/26 202/173 |
| 4,238,296 | A * | 12/1980 | Sadhukhan | C02F 1/10 202/180 |
| 4,310,387 | A * | 1/1982 | Sadhukhan | B01D 3/065 202/175 |
| 2017/0368470 | A1* | 12/2017 | Zheng | C02F 1/10 |
| 2018/0155210 | A1* | 6/2018 | Frolov | B01D 5/0027 |
| 2022/0073373 | A1* | 3/2022 | Palko | C02F 1/048 |

* cited by examiner

IMMISCIBLE LIQUID MEDIATED HUMIDIFICATION / DEHUMIDIFICATION SYSTEMS AND METHODS

CROSS-REFERENCE TO RELATED APPLICATION

Pursuant to 35 U.S.C. § 371, this application is a U.S. National Phase application of PCT/US2019/059264 filed Oct. 31, 2019, which claims priority pursuant to 35 U.S.C. § 119(e) to U.S. provisional application Ser. No. 62/753,817, filed Oct. 31, 2018. The text and contents of each of these patent applications are specifically incorporated herein, in their entireties, by reference.

FIELD OF THE INVENTION

The present invention generally relates to the field of water purification and dewatering of waste. Specifically, embodiments of the present invention relate to novel enhancements to humidification/dehumidification (HDH) systems, and methods for removal of contaminants from feedwater and/or wastewater streams.

DISCUSSION OF THE BACKGROUND

The HDH process is similar to distillation but involves evaporation into and condensation from an atmosphere containing a large portion of non-condensable gases (generally air). The thermal energy driving evaporation is commonly supplied by sensible heat carried by the feedwater itself. This heat is at least partially recovered in the condensation process. The use of a non-condensable atmosphere allows for operation at ambient pressure and relatively low temperatures, permitting simple and inexpensive construction of HDH systems.

HDH has been developed into a robust technology. For example, commercial, modular, multistage HDH systems with added crystallizers are available, allowing treatment of water containing high total dissolved solids (TDS). However, the energy efficiency of these systems is rather poor, with a typical thermal energy input of 1035 MJ/m$^3$ of fresh water (i.e. a gained output ratio (GOR)~2.4) and electrical consumption of 55 MJ/m$^3$. Some recent HDH systems employ variable ratios of feedwater to air throughout the system to match sensible heat capacity of the feedwater to specific enthalpy change with temperature for the moist air for improved energy efficiency. However, these systems still only achieve a GOR of approximately 4.

There are a variety of humidifier and dehumidifier designs applied in traditional HDH including, for humidifiers: spray towers with water droplets falling against a dry air stream flowing upward; packed bed humidifiers with packing material (such as wood, ceramic, canvas and plastic pads) designed to increase heat and mass transfer between water and air; wetted wall humidifiers, in which water flows down a surface with gravity and dry air flows either in a co-current or counter-current direction, including implementations with vertically hanging fleeces made of polypropylene or cotton wicks. Additionally, there are bubble column humidifiers, in which air is bubbled directly through water. There are corresponding ranges of dehumidifier designs, but all suffer the cost and thermal performance penalties of having to physically separate the condensate releasing heat from the feedwater recovering it, in order to prevent fouling of the purified output stream.

Despite the substantial advantages offered by HDH, there are significant shortcomings impeding its application. Perhaps chief among these is the current thermal efficiency. State of the art implementations of HDH only show a GOR of approximately 4. The efficiency of HDH is primarily limited by the exchange of heat from the condensing vapor to the feedwater in the dehumidification stage. There is generally a tradeoff between heat exchanger size/complexity/cost and the heat transfer efficiency. The overall efficiency of HDH is constrained to the current range for economically viable heat exchanger implementations.

A second primary limitation for HDH is recovery ratio (RR) for a single cycle. Since heat for evaporation is generally provided by sensible heat of the feedwater itself, the maximum potential freshwater recovery is limited by the ratio of heat capacity $c_p$ times viable operating temperature difference $\Delta T_{max}$ and heat of vaporization $h_{fg}$. Thus, $RR_{max} = c_p \Delta T_{max}/h_{fg}$. For example, for a single HDH cycle operating between 20-90° C., the maximum recovery ratio is approximately 14%, with actual values in practice substantially lower. Therefore, HDH systems must apply multiple stages to achieve high recovery ratios, with attendant increases in system cost and complexity. HDH is well adapted for use in distributed settings and in combination with solar thermal energy, but its shortcomings, including poor energy efficiency and recovery ratio, severely limit its application.

Thus, there is a need for a humidification/dehumidification system that improves energy efficiency, minimizes or eliminates liquid waste, and significantly lowers the cost of fresh water produced from feedwater having high TDS.

In the sections that follow, the invention is described in reference to desalination apparatuses and processes. However, the invention is not so limited and may also be utilized for removal of contaminants other than salt in both feedwater and wastewater streams.

SUMMARY OF THE INVENTION

The present invention advantageously provides novel enhancements to humidification/dehumidification (HDH) desalination via the introduction of a heat transfer liquid that is independent from and immiscible with the feedwater. By utilizing an immiscible liquid (IL) as the vehicle for sensible heat, high thermal efficiency and high water recovery, including the potential for zero liquid discharge (ZLD) using a single HDH cycle, may be obtained. The combination of high efficiency and low material and fabrication costs allows economical production of freshwater from sources with high total dissolved solids (TDS) exceeding 100,000 ppm. This approach also reduces the need for liquid waste disposal that hampers other techniques limited to lower water recovery ratios.

The primary innovation of immiscible liquid mediated humidification dehumidification (ILM-HDH) is the introduction of an immiscible heat transfer liquid. The inclusion of this additional phase allows three essential enhancements to the HDH process: (1) maximizing heat transfer performance during evaporation/condensation to minimize entropy generation; (2) decoupling heat capacity of working fluid from heat of vaporization to allow higher recovery ratios; and (3) facilitating handling of solutions with precipitates, sludge, and dry salt crystals in the HDH system.

The key improvements offered by the ILM-HDH systems compared to the conventional HDH technology and other competing desalination technologies are (a) dramatically improved energy efficiency (GOR greater than current HDH systems); (b) minimal to zero liquid waste production resulting in minimal waste disposal expense; and (c) low cost and simple construction.

The present invention has several substantial impacts on the state of the art in thermal desalination, including the potential to dramatically lower the levelized cost of water LCOW for high salinity sources; making ZLD feasible for a wide variety of feedwater streams, allowing economical production of water from distributed sources, and eliminating waste disposal constraints for industrial effluent and oil/gas produced water, as well as inland saline water sources without viable liquid waste disposal options.

It is therefore an object of the invention to improve energy efficiency of HDH process increasing GOR above 5.

It is a further object of the invention to minimize or eliminate liquid waste production resulting in significantly lower waste disposal expense.

It is a further object of the invention to maximize evaporation of water from the feed stream.

It is a further object of the invention to significantly lower the cost of fresh water produced for input streams with TDS loading.

It is a further object of the invention to minimize the thermal and electrical energy input to the system.

It is another object of the invention to maximize heat transfer performance during evaporation/condensation to minimize entropy generation.

It is another object of the invention to decouple the heat capacity of the working fluid from the heat of vaporization to allow higher water recovery rates.

It is a further object of the invention to provide handling solutions for precipitates, sludge, and dry salt crystals in the HDH system in order to treat high concentration feedwaters and eliminate liquid waste.

It is to be understood that both the foregoing general description and the following detailed description are exemplary, but not restrictive, of the invention. A more complete understanding of the ILM-HDH systems and the methods disclosed herein will be afforded to those skilled in the art.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will be readily apparent to one skilled in the art that the present invention may be practiced without these specific details.

In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

Embodiments of the present invention advantageously provide improvements to conventional HDH systems and processes, thereby improving energy efficiencies, reducing or eliminating liquid waste streams and significantly lowering the cost of fresh water produced from feedwater streams having high TDS.

The challenge for all thermal desalination approaches is the large discrepancy between the heat of vaporization of water, $h_{fg}$, and the free energy of mixing for salt water solutions, $\Delta G_{mix} = RT(n_{H_2O} \ln(x_{H_2O}) + n_{NaCl} \ln(\gamma_{NaCl} x_{NaCl}))$. For example, the heat required to evaporate 1 kg of feedwater with 100,000 ppm TDS at 80° C. is approximately 100 times larger than the free energy of mixing ($h_{fg}$=2308 kJ/kg, $\Delta g_{mix}$=−24 kJ/kg). Thus, only approximately 1% of the energy transferred during the evaporation process is used in the separation of salt. The remainder, which goes to changing the phase of water, must be efficiently recovered. Exceptional heat transfer performance during evaporation and condensation is required to minimize the temperature loss during these processes and the concomitant loss of exergy that prevents effective application of the recovered heat. Direct contact heat exchange with an immiscible heat transfer fluid facilitates this level of heat transfer performance.

In addition, for the purposes of minimizing liquid waste, recovery ratio must be maximized. In HDH this necessitates the ability to add additional heat to the system far beyond that carried by the feedwater as sensible heat. The immiscible heat transfer fluid provides a vehicle to carry this extra heat and decouple the available sensible heat and the required latent heat.

High recovery ratios with highly saline feedwaters result in concentrate effluent exceeding the solubility limit. In fact, maximal recovery ratios, resulting in waste streams without any significant liquid component, are highly desirable to minimize waste disposal cost. However, the resulting solid phase products must not foul the system during operation. The insolubility of the ionic solutes in the non-polar heat transfer fluids utilized in the ILM-HDH systems creates a robust system able to process effluents with arbitrarily high solids loading.

Systems and Apparatuses for Separation of Solids from Water

Figure 1:
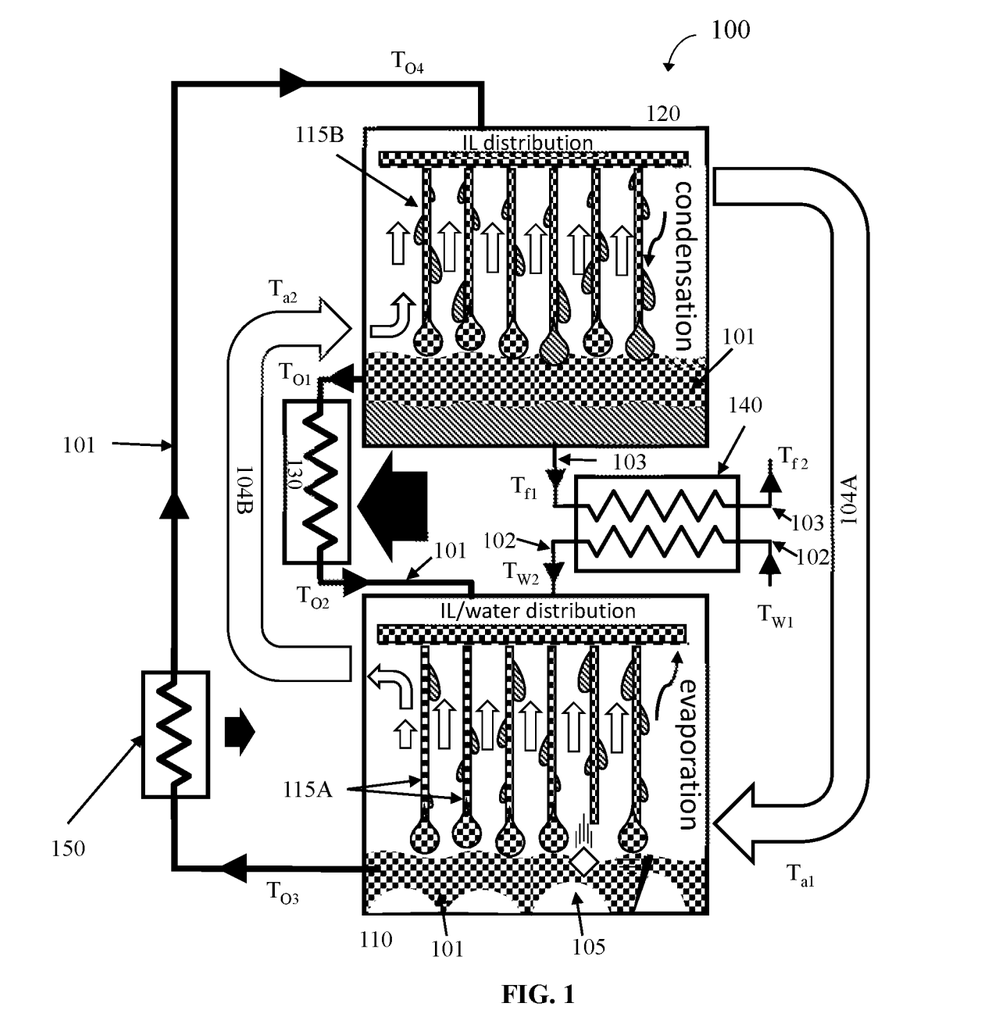
FIG. 1 is a schematic diagram of an apparatus for solids removal and/or recovery of purified water according to an embodiment of the present invention.

The basic operation of an immiscible liquid mediated HDH, or ILM-HDH, system 100 is illustrated in FIG. 1. The ILM-HDH system 100 functions in a manner similar to traditional HDH but introduces an additional heat transfer liquid separate from the feedwater to supply energy for evaporation via sensible heat. The heat transfer liquid is chosen to be immiscible with water, and may, in some embodiments be a low vapor pressure oil (e.g., paraffin oil, silicone oil, halogenated hydrocarbons, vegetable based oils, or non-polar organic or inorganic hydrocarbons). The immiscibility of the heat transfer liquid allows direct contact heat exchange during condensation and evaporation of the water.

The ILM-HDH cycle is started when a cool immiscible liquid (IL) 101 enters heater 130. Heater 130 may be a solar thermal collector or other type of conventional heater capable of heating the IL 101 from an entry temperature $T_{o1}$ to an IL operating temperature $T_{o2}$. The heated IL 101 exits heater 130 at operating temperature $T_{o2}$, enters humidifier 110 and is distributed at or near the top of porous sheets 115A (or other porous media) in the humidifier 110. The porous sheets 115A (or other media) act as direct contact heat exchangers between the IL 101 and feedwater 102. The entry temperature $T_{o1}$ of the IL 101 may range from 20° C. to 90° C. Operating temperature $T_{o2}$ of the IL 101 may range from 30° C. to 120° C.

The porous sheets 115A or media may be any porous, low surface energy material such as flash-spun polyethylene; expanded polytetrafluoroethylene; porous or fibrous polybutylene terephthalate, polypropylene, polyvinylidene fluoride, fluorinated ethylene propylene; or other porous media capable of providing substantially continuous heterogeneous contact between IL 101 and the feedwater 102. The area of the porous sheets 115A, and number and spacing of porous sheets 115A vary depending on the material utilized, the flowrate of feedwater to be treated and the physical constraints of the humidifier itself, but in typical applications, an area between 20 m² and 500 m² would provide capability to treat 1 m³/day of feedwater flow.

Although typically referred to as porous "sheets," the porous sheets may be a single sheet, or a set of sheets, wherein a set is two or more sheets, spaced a distance apart. The length, width and thickness of each porous sheet within a set may be the same, or may be different for different sheets. Likewise, the spacing between sheets may be the same, or may vary from sheet to sheet.

The IL 101 flows downward in the pore spaces of the sheets or media 115A under the force of gravity. In some embodiments, the feedwater 102 may also be preheated in a heat exchanger 140 from a temperature $T_{w1}$ entering heat exchanger 140 to an exit temperature $T_{w2}$, utilizing warm fresh water 103 exiting from dehumidifier 120, or another heat source. Most typically, heat exchanger 140 is a counter flow heat exchanger, but other types of conventional heat exchanges may be utilized as well.

The feedwater 102 is then supplied to humidifier 110. The feedwater 102 is likewise distributed at or near the top of the porous sheets or other media 115A, but being immiscible with the IL 101, flows along the outer surface porous sheets 115A. The feedwater temperature $T_{w2}$ entering the humidifier 110 may range from 5° C. to 95° C.

Cool dry air 104A at a temperature $T_{a1}$ is introduced/enters into the bottom of humidifier 110 and flows upward past the porous sheets 115A or other porous media thus driving evaporation of the feedwater 102. Sensible heat, primarily from the IL 101, provides the energy for evaporation. Additionally, sensible heat may be contributed by the feedwater and/or supplied directly to the evaporator, e.g. via heating of the porous sheet or its substrate.

The flow rate of IL 101, feedwater 102 and air 104A may be adjusted to provide sufficient sensible heat for desired evaporation of feedwater 102, up to complete evaporation of the feedwater 102, leaving only salt crystals 105 as the product of the evaporation process in humidifier 110.

The salt crystals 105 fall from the IL impregnated porous sheets or media 115A and settle to the bottom of the humidifier 110 underneath a pool of the IL 101 collecting from the flow emanating from the porous sheets or media 115A. The salt 105 is insoluble in the IL 101 and may be removed from the system by periodic dredging, or other conventional manner of removal.

The IL 101, now cooled by the evaporating feedwater 102, as well as the air 104B, which has been heated and humidified, both leave the humidifier 110 and travel to the dehumidifier 120. The temperature $T_{o3}$ of the IL 101 exiting the humidifier 110 may range from 5° C. to 90° C. The temperature $T_{A2}$ of the air leaving the humidifier 110 may range from 25° C. to 100° C. The relative humidity of the air leaving the humidifier may range from 50% to 100%.

In some embodiments, before traveling to the dehumidifier 120, the IL 101 may be further cooled from temperature $T_{o3}$ exiting humidifier 110 to a subcooled temperature $T_{o4}$ by heat exchanger 150, prior to distribution to the dehumidifier 120. Heat exchanger 150 may be a conventional single or double pass forced air cooler, or may be another conventional cooler, capable of cooling the IL 101 from $T_{o3}$ to $T_{o4}$ prior to entry into dehumidifier 120. Temperature $T_{o4}$ may range from 5° C. to 80° C.

Dehumidifier 120 has a similar structure to the humidifier 110. The cool IL 101 is distributed at the top of, and flows down, porous sheets or media 115B, which now act as heat sinks to drive condensation from the hot moist air 104B flowing upward. Fresh water 103 condenses on the outer surface of the sheets or media 115B and flows, under gravity, to the bottom of the dehumidifier 120. The fresh water 103 is immiscible with the IL 101 and collects as a layer underneath IL 101, in a pool at the bottom of the dehumidifier 120, similar to many conventional oil/water separators (e.g., oil/water separators used in petroleum production). The flowrates of the IL 101 and hot moist air 104B may be adjusted to promote condensation of fresh water 103 from the air 104B.

Fresh water 103 leaves the dehumidifier 120 at a high temperature $T_{f1}$ (nearly equal to temperature $T_{a2}$ of the hot moist air entering it) then passes through heat exchanger 140 (typically a counterflow heat exchanger) that recovers its sensible heat to the incoming feedwater 102, and drops the temperature of fresh water 103 to $T_{f2}$. The cool dry air 104B leaves the top of the dehumidifier and is recycled to the humidifier 110, while the hot IL 101 is collected from the pool at the base of the dehumidifier 120 and returns to heater 130 to begin the cycle again. The temperature $T_{f1}$ of the fresh water leaving the dehumidifier may range from 20° C. to 90° C.

Similar to the humidifier section, the area of the porous sheets 115B in the dehumidifier section, and number and spacing of porous sheets 115B vary depending on the material utilized, the flowrate of the feedwater treated and the physical constraints of the humidifier itself, but in typical applications, an area between 20 m² and 500 m² would provide capability to recover 1 m³/day of water flow. Like the humidifier 110, the dehumidifier 120 may comprise a single porous sheet or a set of porous sheets, and the size and spacing of the porous sheets 115B may be the same as or different than the porous sheets 115A. Likewise, the material utilized for porous sheets 115B may be the same as or different than the material used for porous sheets 115A.

Although FIG. 1 shows a single segment (stage) each for humidification and dehumidification, these components can be broken into multiple segments (stages) to allow variation of the relative IL and air flow rates to balance the enthalpy variation associated with the changing humidity of the air and the sensible heat of the IL. This is essential for achieving high efficiency as discussed below.

Performance of ILM-HDH relies on the ability to achieve efficient thermal transport and to handle effluent with large solids loading. Additionally, to meet low levelized cost of water (LCOW) targets, the system must have also have low capital cost.

Even with low cost solar thermal heat (e.g. levelized cost of heat, LCOH=$0.01/kWhth), achieving LCOW of <$1.50/m³ in a small-scale system requires substantial improvements in the energy efficiency of HDH. HDH currently shows a GOR of approximately 4 compared to modern multi-effect distillation and multistage flash which can readily reach GORs of 12-18. The ultimate cause of thermal inefficiency in HDH is stream-to-stream temperature difference between the air and water, which results in entropy generation. This temperature difference has two fundamental causes.

Thermodynamic Constraints on Stream-to-Stream ΔT

Figure 2:
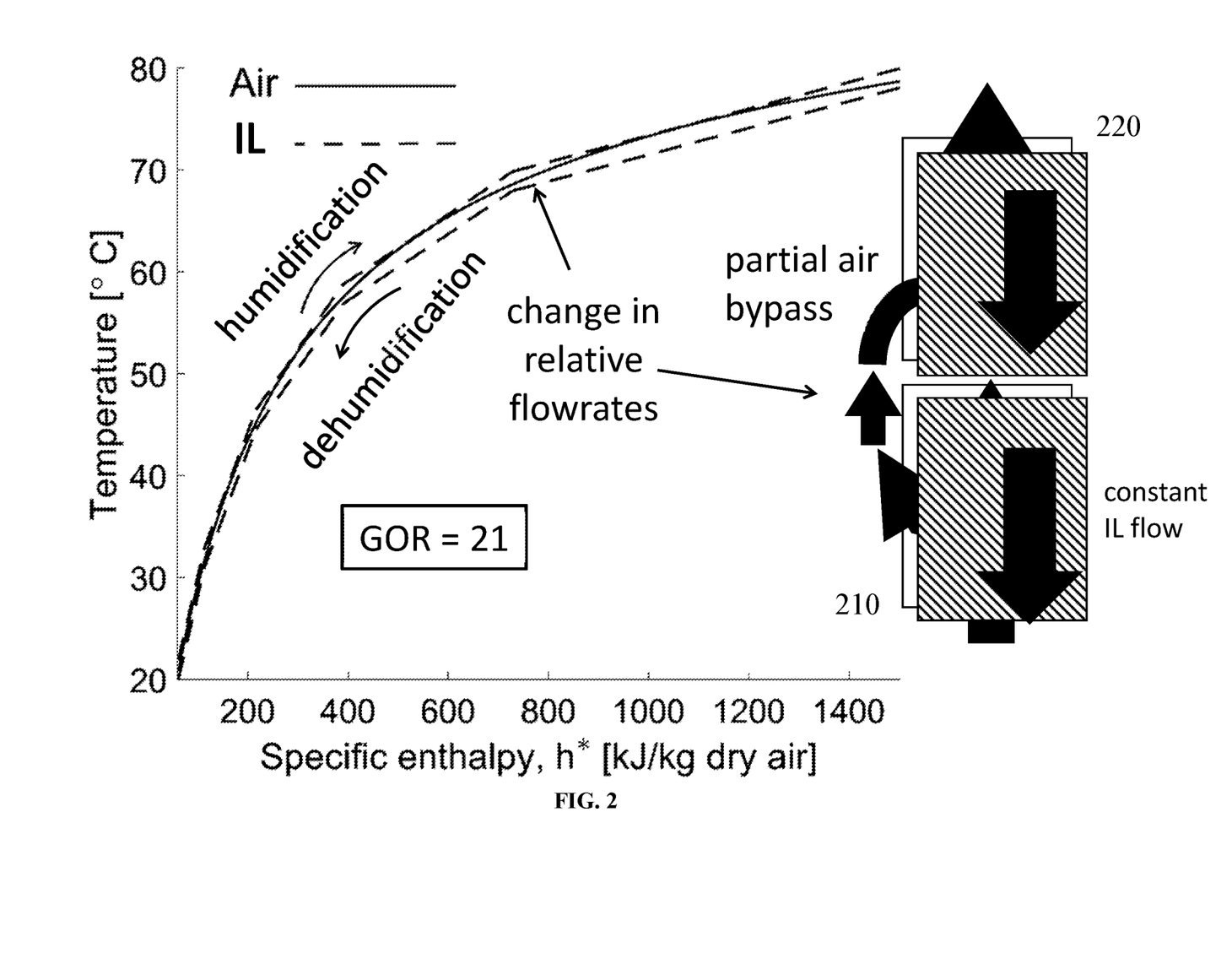
FIG. 2 is a schematic diagram showing the minimization of stream to stream temperature differences by changing relative flow rates of air and heat transfer liquid.

The first contributor to stream-to-stream ΔT is the difference in temperature dependence of sensible heat capacity and latent heat between the liquid and air phases. The specific enthalpy of moist saturated air has a strongly non-linear dependence on temperature due to the rapid increase in humidity ratio with temperature (corresponding to the partial pressure of water vapor), as seen in FIG. 2. By comparison, the specific heat capacity of the liquid stream is essentially constant (straight line segments in FIG. 2). This results in an inherent temperature difference between the streams during humidification or dehumidification, much like a heat capacity imbalance between the streams of a traditional heat exchanger.

The variability of the stream-to-stream temperature difference is a major source of entropy generation in HDH, and variation of the mass flow rate of air through extraction/injection, to keep the stream-to-stream temperature difference small in all stages of humidification and dehumidification, is shown schematically in FIG. 2. By varying the relative flow rates of the IL and air streams, the temperature difference can be minimized. Entropy generation is minimized at a fixed energy effectiveness when the modified heat capacity rate ratio (HCR) in the dehumidifier is equal to unity:

$$HCR = \frac{\Delta H^*_{max,cold}}{\Delta H^*_{max,hot}} = \frac{\frac{\Delta H^*_{max,cold}}{\dot{m}_{dry\ air}}}{\frac{\Delta H^*_{max,hot}}{\dot{m}_{dry\ air}}} = \frac{\Delta h^* + \Psi_{deh,cold}}{\Delta h^* + \Psi_{deh,hot}}$$

Where $\Psi$ is the enthalpy difference corresponding to the minimum temperature difference in the component, also known as the "enthalpy pinch."

$$HCR=1 => \Psi_{deh,cold}=\Psi_{deh,Hot}$$

FIG. 2 diagrammatically shows minimizing stream to stream temperature difference by changing relative flow rates of air and the IL (the heat transfer liquid). Temperature versus enthalpy scaled per kilogram of dry air is shown for saturated moist air (solid curve) and the IL (line segments curve). Each line segment represents the sensible heat capacity of the IL scaled to the flow rate of air. When relative flow rates change, for example, due to bypass of air out of the humidifier 210 to the dehumidifier 220, the slope of the IL line changes. The temperatures of the IL line segments are also offset based on the entrance temperature of the air at each segment.

For a balanced HDH system, the enthalpy pinch point will be located at the inlet and outlet of the dehumidifier, and at a single intermediate location in the humidifier. The same definition of balance is used for a system with multiple extraction and injections, where balance in each stage (between two consecutive extraction or injection points) satisfies these conditions of minimum and equal enthalpy differences at inlet and exit of a dehumidifier stage.

The energy balance of a segment of humidifier 210 or dehumidifier 220 in an ILM-HDH system (neglecting the small sensible heat capacity addition of feedwater) may be written as:

$$\dot{m}_{oil}c_{oil}(T_2-T_1)_{oil}=\dot{m}_{dry\ air}(h^*_2-h^*_1)$$

where $\dot{m}_{oil}$ is the mass flowrate of the IL, coil is the specific heat capacity of the IL, $T_1$ is the outlet temperature of the IL for the segment, $T_2$ is the inlet temperature of the IL for the segment, $\dot{m}_{dry\ air}$ is the mass flowrate of the non-condensable component of the air, $h^*_2$ is the outlet specific enthalpy of the air on a dry-air mass basis for the segment, and $h^*_1$ is the inlet specific enthalpy of the air on a dry-air mass basis for the segment.

or if the differential form:

$$\frac{dT_{IL}}{dh^*} = \frac{1}{m_r c_{oil}}, m_r = \frac{\dot{m}_{dry\ air}}{\dot{m}_{oil}}$$

where $T_{IL}$ is the local temperature of the IL, and $h^*$ is the local specific enthalpy of the air on a dry-air mass basis.

The GOR may then be expressed as:

$$GOR = \frac{\left(\sum_1^N \dot{m}_{dry\ air}\Delta\omega\right)*h_{fg}}{\dot{m}_{oil}c_p * \Delta T_{in}}$$

$$\Delta T_{in} = T_{Deh,end} - T_{Hum,end}$$

where $\Delta\omega$ is the change in absolute humidity for the segment, $h_{fg}$ is the specific enthalpy of vaporization for water at the local water temperature, $T_{Deh,end}$ is the IL temperature at the exit of the dehumidifier, $T_{Hum,end}$ is the IL temperature at the exit of the humidifier, and the summation is over the number of segments, 1 to N.

To increase GOR, $\Delta T_{in}$ must be minimized, and therefore, the heat transfer fluid (the IL) must follow an enthalpy curve similar to the moist air.

An ILM-HDH system may comprise up to five or more humidification and five or more dehumidification segments or stages (e.g., 2, 3, 4, 5, 6, etc.). Most typically, the number of humidification stages will equal the number of dehumidification stages.

In one embodiment, an ILM-HDH system may comprise a five (5) section humidifier and dehumidifier (i.e., four (4) changes in relative flow rate), a cold feed IL temperature of 20° C. and a top brine temperature of 80° C. The primary independent variables are the number of extractions (e.g., N=4) and the enthalpy pinch (e.g., Ψ=3 kJ/kg dry air). FIG. 2 shows the energy balance of the ILM-HDH system resulting in a Gained Output Ratio (GOR) equal to 21.

Heat Transfer Constraints on Stream-to-Stream ΔT

The second primary contribution to the stream-to-stream ΔT is the kinetic limitation for heat transfer (and corresponding mass transfer) between the air and liquid phase, specifically for condensation in the dehumidifier. Air is a non-condensable gas which creates a diffusive resistance for the water vapor traveling to the condensation surface. This diffusive layer has a significant effect on condensation heat transfer coefficients as commonly noted for steam condensers in, for example, power plants. In HDH, there is a large percentage of air (60-95% by mass) in the condensation stream.

Typically, overall heat transfer coefficients may range between 5000 to 1000 W/m²K, for 10 to 90% air mass fraction. In mixed gas streams with inlet temperatures ranging from 68 to 92° C. and an inlet air mass fraction from 34 to 81%, overall heat transfer coefficients up to 3000 W/m²K or more are achievable. This agrees well with a simple one dimensional analytical model for condensation in the ILM-HDH system considering the diffusive resistance to mass transport from the center of the air channel to the condensation surface. This results in an expression for the condensation thermal resistance of:

$$R_c = \frac{L_{air}}{h_{fg} D \frac{dc}{dT}}$$

where $L_{air}$ is the mean diffusion length, $h_{fg}$ is heat of vaporization of water, D is the diffusion coefficient of water in air, and dc/dT is the change of water vapor component density with temperature. For a 1 mm air channel at 90° C. this yields a value of less than 0.0004 K/(W/m²).

The condensation heat transfer coefficient is also well known to be enhanced for dropwise condensation. When the heat transfer coefficient of filmwise condensation (FWC) and dropwise condensation (DWC) in the presence of non-condensable gas are compared, nearly two times improvement in the heat transfer coefficient over a range of inlet non-condensable gas concentrations is achieved. The IL infused porous sheets in ILM-HDH creates a robust non-wetting surface assuring dropwise condensation.

The final component of heat transfer resistance is conduction resistance into the IL saturated porous sheet itself given by:

$$R_{wick} = \frac{L_{wick}}{k_{wick}}$$

where $L_{wick}$ and $k_{wick}$ are the mean wicking length and effective thermal conductivity, respectively. The value for a mineral oil saturated, 100 μm thick, flash spun polyethylene wick is less than 0.0002 K/(W/m²).

These low thermal resistances facilitate the small enthalpy pinch values necessary to achieve high GOR (e.g. GOR>20 at Ψ=3 kJ/kg dry air) at reasonable production per unit area of dehumidifier (e.g. ~12 g/min/m²). This corresponds to approximately 58 m² of dehumidifier area per 1 m³/day of production capacity or approximately 0.058 m³ of dehumidifier volume with 1 mm spacing between sheets.

Precipitate Handling

One of the primary advantages offered by ILM-HDH is the ability to reach arbitrarily high recovery ratios in a single pass compared to the low recover ratios available with traditional HDH (e.g., <10%). However, for the high solute concentration input streams targeted (e.g., 10% TDS), this implies significant precipitation during humidification. Indeed, essentially complete precipitation resulting in zero liquid discharge (ZLD) or no liquid waste is highly desirable for users dealing with high TDS streams for which minimizing waste disposal is often the primary goal rather than obtaining the freshwater stream.

In order to perform in this operational regime, the ILM-HDH system must be able to handle effluent consisting largely or entirely of solid precipitate. The primary concern under these conditions is one of fouling of the porous sheets in the humidifier over which the feedwater and effluent must flow. In this regard, the introduction of an immiscible heat transfer liquid greatly improves the robustness of the humidifier. Liquid infused surfaces have been shown to offer remarkable repellant and antifouling properties, even against very aggressive foulants such as scale forming minerals in water treatment scenarios. The anti-fouling nature of the surface relies on the liquid phase within the porous substrate remaining intact. The flow of non-polar heat transfer liquid in the ILM-HDH system helps to ensure the continuous renewal of the liquid buffer layer and integrity of the antifouling surface.

Any particularly recalcitrant precipitate that accumulates in the humidifier may also be removed periodically, for example, with a mild acid rinse delivered in the same manner as the feedwater.

Figure 3:
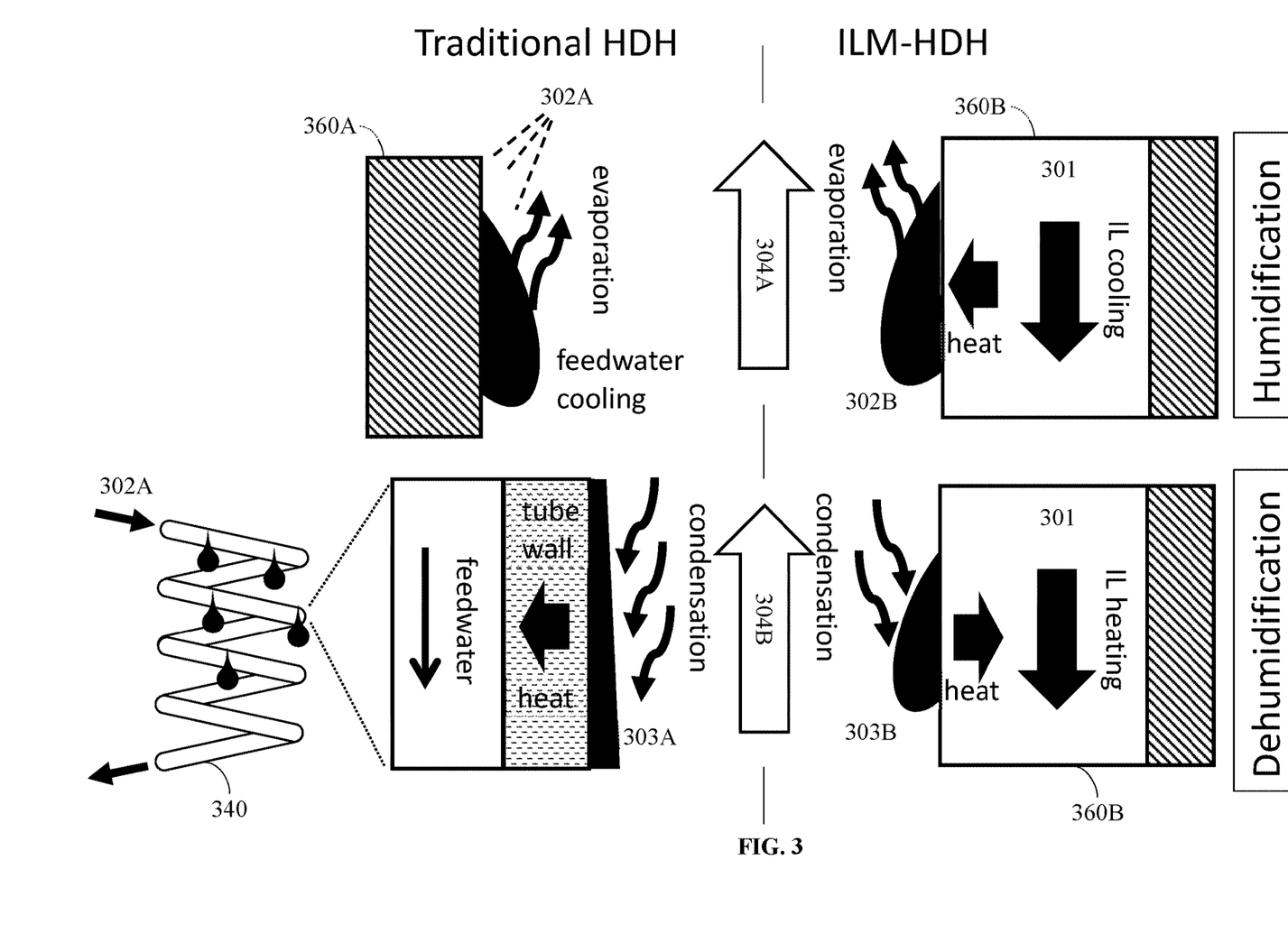
FIG. 3 is a schematic diagram comparing ILM-HDH with a traditional HDH system.

Referring now to FIG. 3, the ILM-HDH process is compared to a traditional heat transfer process. The left side of FIG. 3 represents traditional heat transfer for humidification and dehumidification. The right side of FIG. 3 shows the ILM-HDH process.

In the traditional heat transfer humidification process, warm feedwater 302A contacts cool dry air 304A, generally as the air 304A is blown over some type of media 360A. At least some of the feedwater 302A is evaporated into the air, which becomes warm humid air 304B, as the feedwater 302A cools. In the traditional dehumidification heat transfer process, the warm humid air 304B is blown over one or more coils 340, as cold feedwater 302A is circulated through the coils 340. The cold feedwater 302A acts as a heat sink, picking up the heat from the warm humid air 304B blowing over the coils 340. The moisture from the air 304B condenses on the outside of the coils 340 as the air cools, and the condensation (fresh water) 303A is collected.

In the ILM-HDH process, warm feedwater 302B contacts a hot IL 301 and evaporates into cool dry air 304A as the air 304A is blown over porous media 360B. The hot IL 301 cools as its heat is transferred to the feedwater 302. The cool dry air 304A becomes warm humid air 304B as the feedwater 302B evaporates. In the ILM-HDH dehumidification process, the warm humid air 304B contacts the cool IL 301, which acts as a heat sink, cooling the air 304B and heating the IL 301. As the air 304B cools, fresh water 303B condenses and is collected.

The schematic diagram of FIG. 3 shows that the IL 301 mediates the transfer of heat from fresh water condensation (during dehumidification) to feedwater during evaporation (humidification).

Figure 4:
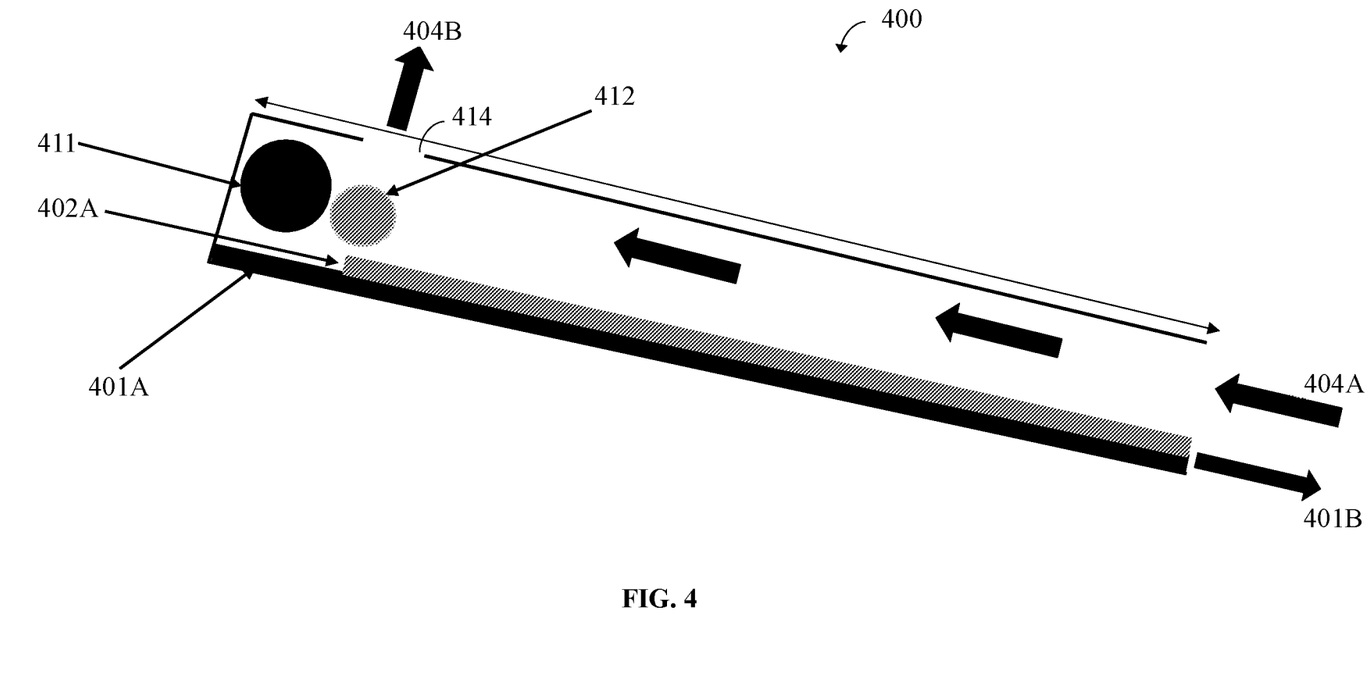
FIG. 4 is a schematic diagram showing water, an immiscible liquid (IL) and air inside a channel of an ILM-HDH process.

FIG. 4 schematically shows IL, water and air flow inside a channel 400 of a humidifier portion of the ILM-HDH system. Hot IL 401A enters at or near the top of the channel 400 at IL inlet 411, and flows downward giving up its heat to feedwater 402A, and exiting as cold IL 401B at or near the bottom of the channel 400. The feedwater 402A enters at or near the top of the channel 400 at water inlet 412, and flows downward picking up heat from the hot IL 401A, and completely evaporates into cold dry air 404A. The cold dry air 404A enters at or near the bottom of the channel 400 and exits as hot humid air 404B at or near the top of the channel 400 at air outlet 414, picking up moisture from the evaporating feedwater 402A.

Figure 5:
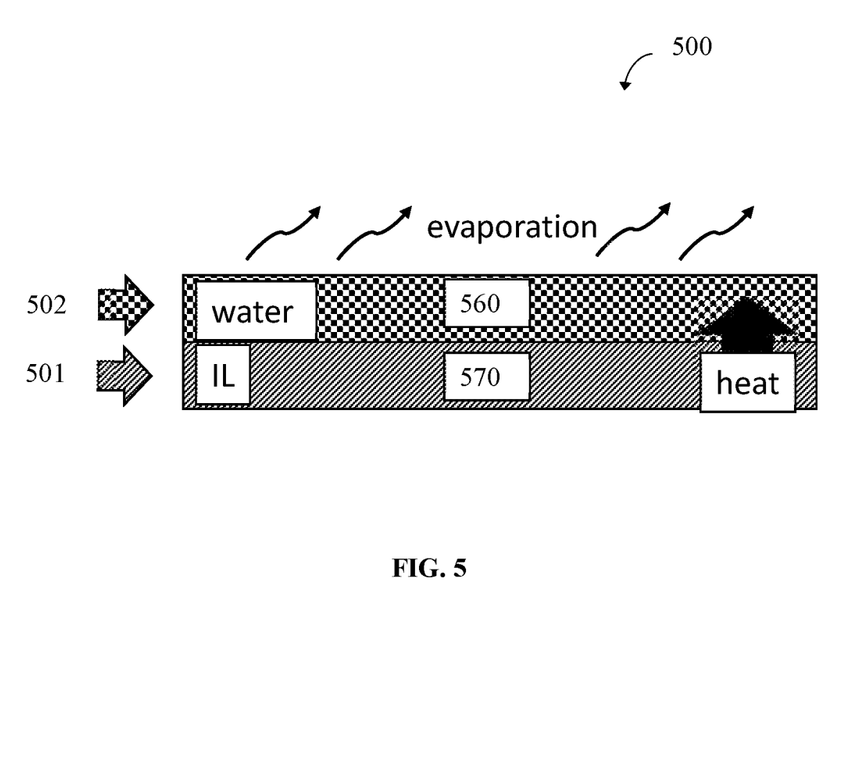
FIG. 5 is a schematic diagram showing water and IL disposition in a porous bilayer with heterogeneous wetting properties.

To maintain IL flow under the water in the ILM-HDH system while exposing a large surface area for water evaporation or condensation, two porous materials are utilized, one which is hydrophobic (preferentially absorbing oil or other non-polar liquids) and the other which is hydrophilic. FIG. 5 shows a schematic of a porous bilayer 500 with a hydrophilic layer 560 above a hydrophobic layer 570, creating intimate contact for heat transfer between the IL 501 and water 502, while maintaining a large surface area for evaporation. The hydrophilic layer may be cellulose tissue (e.g., KIMWIPE® or similar) and the hydrophobic (oleophilic) layer may be high-density polyethylene (e.g., TYVEK® or similar).

Figure 6:
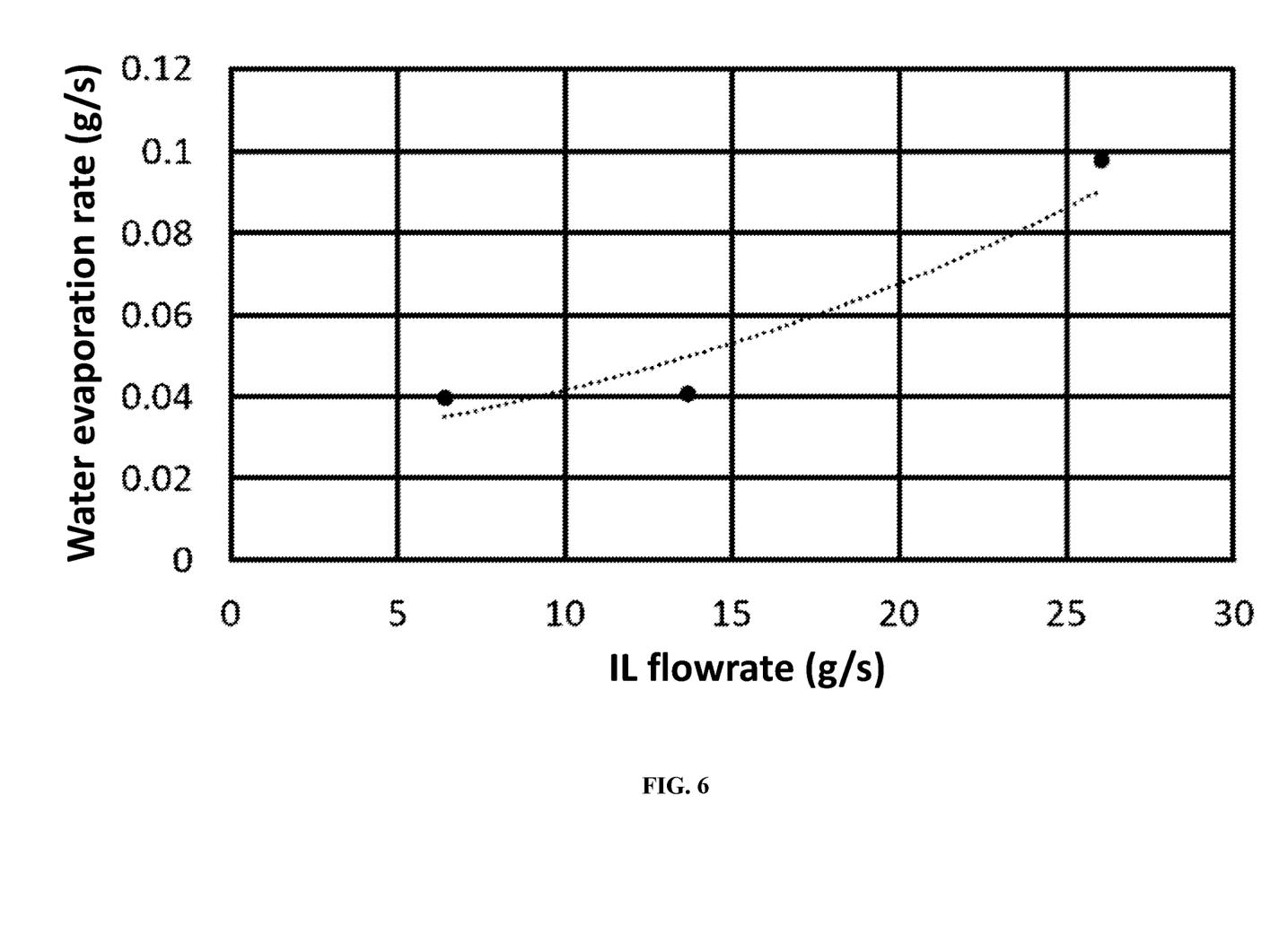
FIG. 6 is a graph of water evaporation as a function of IL flow rate.
Figure 7:
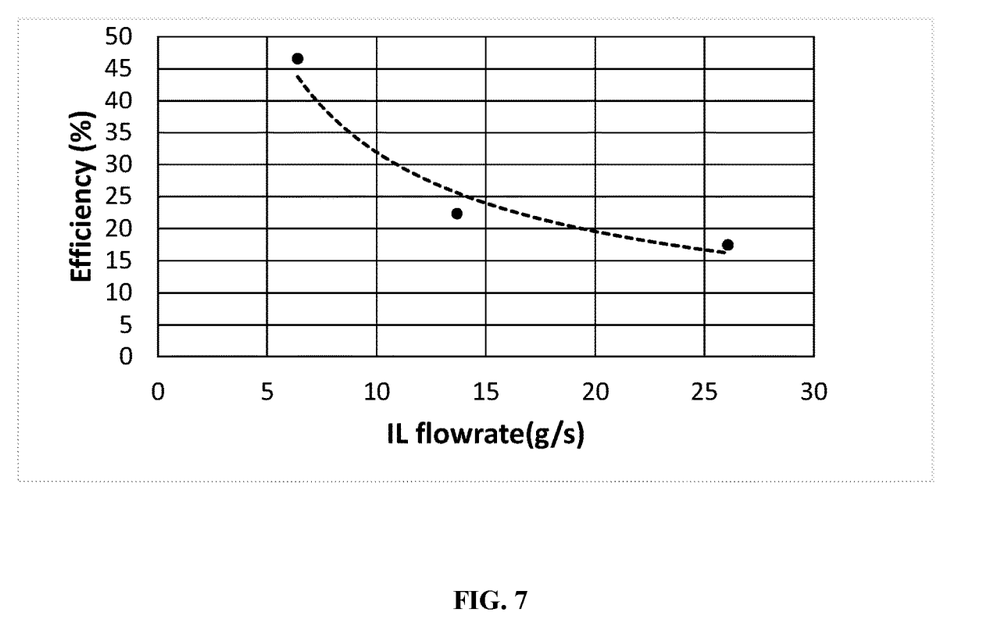
FIG. 7 is a graph of the efficiency of a ILM-HDH humidifier as a function of IL flow rate.

FIGS. 6 and 7 show, respectively, water evaporation (in grams/second (g/s)) as a function of IL flow rate (in g/s), and percent efficiency (defined as portion of input thermal energy used in evaporation) as a function of IL flowrate (in g/s) for a single channel evaporator. As can be seen in FIG. 6, water evaporation increases with IL flowrate. However, as can be seen in FIG. 7, efficiency decreases with IL flowrate.

Cost and Efficiency of ILM-HDH

Thermal models show the ability of ILM-HDH to exceed a GOR of 20 with sufficiently efficient heat transfer. This represents a dramatic reduction in energy usage compared to traditional HDH (GOR<4). Assuming availability of solar thermal energy in the relevant temperature range (e.g., 90° C.) at a levelized cost of $0.01/kWh$_{th}$, this corresponds to an energy component of operational cost of $0.33/m$^3$ for the ILM-HDH system.

HDH has potential for low capital cost implementations due to the relative simplicity of the components and its atmospheric pressure operation. ILM-HDH requires changes to the humidifier and particularly the dehumidifier compared to traditional HDH. These changes potentially reduce the cost of the humidifier/dehumidifier components because more complex elements using expensive materials (e.g. heat exchangers) are replaced with simpler elements made from low cost materials, namely porous sheets guiding IL flow.

The ILM-HDH system also requires an additional liquid handling loop. However, the primary liquid flow is still the liquid supplying the sensible heat for evaporation, in this case, the IL. The water flow for ILM-HDH is only that which is evaporated, approximately 2-4% of the IL flow. Therefore, the water handling loop is minimal in comparison to the IL loop, and minimal in comparison to the water handling loop in traditional HDH systems. Furthermore, based on potential improvement in thermal efficiency, the flow rate of IL is expected to be as low as 50% of the flow of feedwater in traditional HDH for the same freshwater output. This reduces the cost of the associated pump and piping even after accounting for the higher viscosity of the IL.

An additional cost savings are realized for the integration of ILM-HDH with solar thermal sources. The same immiscible heat transfer fluid used in the ILM-HDH system can be directly circulated in a solar collector eliminating the cost of a heat exchanger. For high TDS feedwater, this cannot generally be accomplished with traditional HDH system.

An estimate of the levelized cost of water produced by a notional ILM-HDH system is as follows: the capital cost of a small scale (3 m$^3$/day) HDH system has been found to be about $4195/(m$^3$/day). Applying a conversion of $0.17/m$^3$/$700/(m$^3$/day) yields an amortized cost of $1.02/m$^3$ of fresh water. However, approximately 30% of the capital cost is due to the condenser and more traditional humidifier components, leaving roughly $0.70/m$^3$ amortized costs for the common components of ILM-HDH and traditional HDH. Additionally, ILM-HDH requires porous sheets to replace the traditional heat exchange components. At a bulk unit cost of approximately $1.50/m$^2$ for flash spun polyethylene or expanded polytetrafluoroethylene, and a required area of about 58 m$^2$/(m$^3$/day) for the humidifier and dehumidifier each, this contributes $0.04/m$^3$ amortized cost, which is expected to roughly double to $0.08/m$^3$ when accounting for the cost of the IL and water distribution manifolds for each sheet. In some embodiments, the water distribution manifolds may be plastic.

Additionally, the size and complexity of the housing is expected to increase by roughly 10% and an additional factor of 20% is attributed to the fluid handling components due to the need for a small additional water handling subsystem. These contribute $0.20/m$^3$ yielding an amortized cost of $0.98/m$^3$ for the small scale ILM-HDH system. Assuming installation to account for 5% of the capital cost and operating costs for maintenance to be 10% of the amortized cost, the total LCOW is calculated to be $0.98/m$^3$ amortized cost+$0.05/m$^3$ installation+$0.10/m$^3$ maintenance cost+$0.33/m$^3$ energy cost=$1.46/m$^3$ for a user deployed system (i.e. no profit considered in cost). Thus, even for very small systems (3 m$^3$/day) the LCOW for ILM-HDH is expected to fall below $1.50/m$^3$. For larger system scales, the capital cost is expected to drop significantly.

Operating Conditions

Preferred operating conditions are those that maximize evaporation of water from the feed stream, maximize recovery of water from the feed stream, and minimize the ratio of thermal and electrical energy input to the system from the IL heater, pumps, and blowers to the mass of water evaporated or condensed.

Increased evaporation of water from the feed stream is achieved by increasing the ratio of the flowrates of IL to feedwater, IL temperature at the inlet of the humidifier, and air flow rate at a fixed inlet air temperature and humidity defined by the ambient conditions.

Recovery of water from the feed stream is increased by increasing the ratio of the flowrates of IL to feedwater, increasing IL temperature at the inlet of the humidifier, decreasing IL temperature at the inlet of the dehumidifier, and increasing air flow rate at a fixed inlet air temperature and humidity defined by the ambient conditions.

Increasing the ratio of thermal and electrical energy input to mass of water evaporated or condensed requires reducing the ratio of the flowrates of IL to feedwater, reducing immiscible liquid temperature at the inlet of the humidifier, and reducing the air flow rate compared to either the maximum evaporation or maximum recovery cases.

One example operational case of interest is the evaporation of 99% of the water from an input feed stream that initially contains 1% dissolved solids. This case is of interest to minimize the mass of waste to be disposed.

Another example operational case of interest is the recovery of 90% of the water from an input feed stream that initially contains 1% dissolved solids. This case is of interest to maximize the purified water recovered.

An additional example operational case of interest is the recovery of 50% of the water from an input feed stream that initially contains 1% dissolved solids. This case is of interest to provide a reasonable tradeoff between the mass of waste to be disposed and the purified water recovered.

Methods of Removing Dissolved Solids from Water

Figure 8:
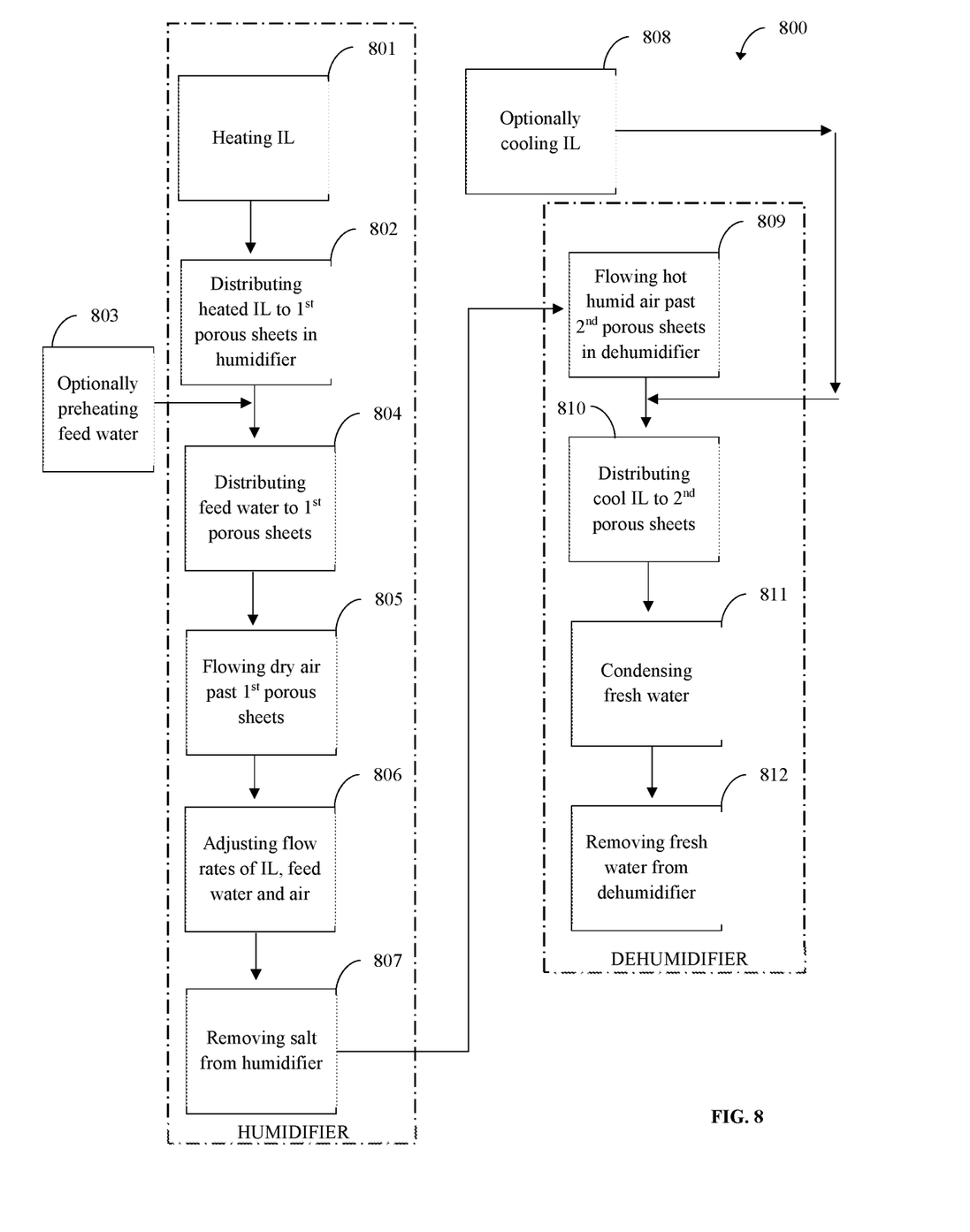
FIG. 8 is a flow diagram of a method of removing solids and/or recovering purified water from feedwater utilizing an ILM-HDH system.

Referring now to FIG. 8, therein is shown a method 800 of removing dissolved solids from water. The method begins at step 801, by heating an IL (e.g., by circulating the IL through a solar collector, or by use of a conventional method of heating an IL). At Step 802, the IL is distributed to one or more first porous sheets in a humidifier. Typically, the heated IL is distributed at or near the top of the one or more first porous sheets, and the IL flows down the first porous sheets by way of gravity.

At optional step 803, feedwater may be preheated before entering the humidifier. In embodiments where the feedwater is preheated, the preheating may comprise circulating the feedwater through a heat exchanger (e.g., a counterflow heat exchanger) using the fresh water produced by the dehumidification process (see step 812 below). At step 804, the feedwater is distributed to the one or more first porous sheets in the humidifier. Most typically, and similar to the IL, the feedwater is distributed at or near the top of the humidifier.

At step 805, dry air enters the humidifier, typically at or near the bottom of the humidifier, and flows upward across the one or more first porous sheets. At step 806 flow rates of the IL, feedwater and/or dry air are adjusted to ensure complete evaporation of the feedwater into the dry air. As a result of the evaporation of the feedwater into the air, solids (e.g., salt) drops out of the feedwater and collects at the bottom of the humidifier and may be removed at step 807.

At optional step 808, the IL cooled by the transfer of heat to the feedwater to cause evaporation, is further cooled (prior to distributing the IL to the dehumidifier at step 810). At step 809, hot humid air from the humidifier is delivered/circulated to the dehumidifier. Typically, the hot humid air is delivered at or near the bottom of the dehumidifier and flows upward across one or more second porous sheets in the dehumidifier.

At step 810, cool IL is distributed/circulated to the one or more second porous sheets, most typically, at or near the top of the sheets, and flows downward over the sheets, picking up heat from the hot humid air flowing (typically) upward. At step 811, fresh water condenses out of the moist humid air on to the outer surface of the second porous sheets, and collects under the IL at the bottom of the dehumidifier. At step 812, the fresh water leaves the dehumidifier and optionally may be used to preheat the feedwater at optional step 803.

Although the humidification portion of the method (steps 802 through 807), and the dehumidification portion of the method (steps 809 through 812) are described as single stage humidification/dehumidification processes, the humidification and dehumidification may take place in multiple stages by repeating the corresponding steps in the method for humidification/dehumidification. Additionally, the method is not restricted to the order of the steps described herein, and steps of the method may be performed in any appropriate order to achieve the desired humidification/dehumidification and removal of dissolved solids from the feedwater.

Methods of Separating Water from a Solution or Mixture

Figure 9:
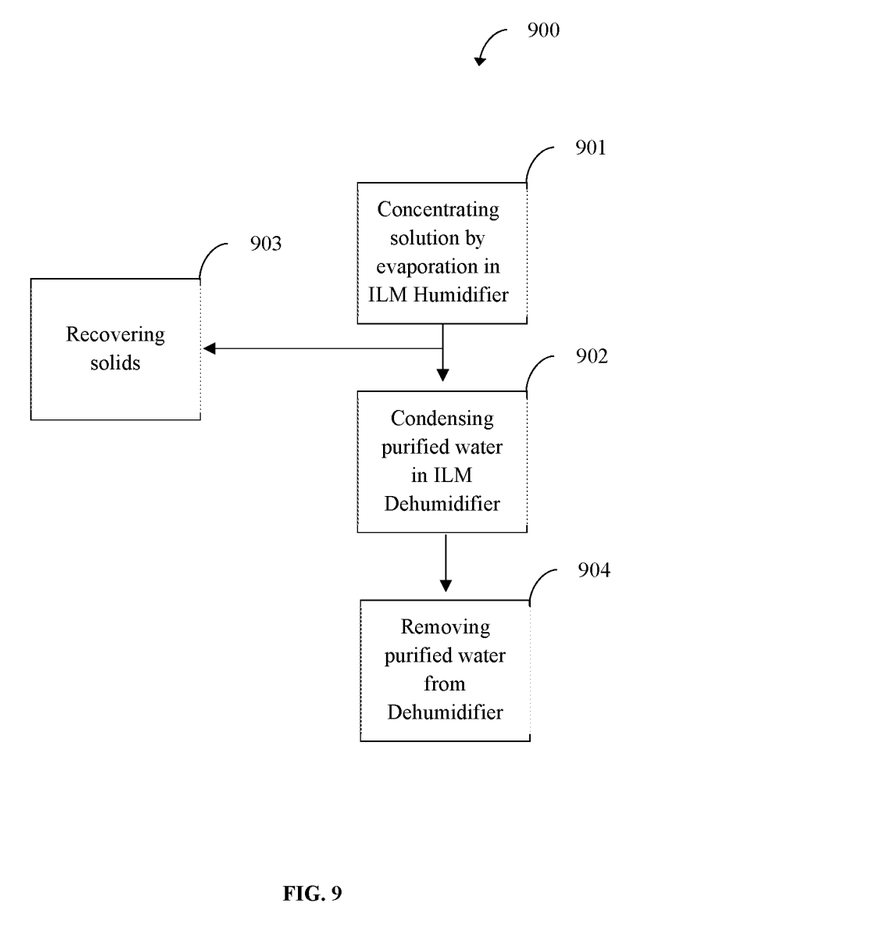
FIG. 9 is a flow diagram of a method of separating water from a solution or mixture.

FIG. 9 is a flow diagram of a method for separating water from a solution or mixture. The method begins at step 901 by concentrating the solution or mixture by evaporating water from the solution or mixture into air, the evaporating occurring by direct contact heat transfer between an immiscible heat transfer liquid and the solution or mixture. At step 902, purified water is condensed from the air by direct contact between the immiscible heat transfer liquid, the air and/or the purified water; wherein the heat transferred by the immiscible heat transfer liquid during evaporation is recovered by the immiscible heat transfer liquid during condensation. At optional step 903, solids precipitated from the solution or mixture are recovered, and at step 904, the purified water is removed from the dehumidifier.

As indicated for the method of FIG. 8, the steps of the method of FIG. 9 may be performed in any appropriate order to achieve the desired humidification/dehumidification and separation of water from the solution or mixture.

The foregoing descriptions of specific embodiments of the present invention have been presented for purposes of illustration and description. They are not intended to be exhaustive or to limit the invention to the precise forms disclosed. Obviously, many modifications and variations are possible in light of the above teaching. The embodiments were chosen and described in order to best explain the principles of the invention and its practical application, to thereby enable others skilled in the art to best utilize the invention and the various embodiments and modifications as are suited to the particular use contemplated. It is intended that the scope of the invention be defined by the components and elements described herein and their equivalents.

What is claimed is:

1. An apparatus comprising:
   a heater for heating a liquid heat transfer media that is immiscible with water;
   a humidifier section comprising at least one first porous sheet allowing contact between the heated liquid heat transfer media and the water such that the water evaporates into dry air flowing past the at least one porous sheet, thereby producing moist air, cool heat transfer media and separated solids;
   a dehumidifier section comprising at least one second porous sheet for allowing contact between the cool liquid heat transfer media and the moist air flowing past the at least one second porous sheet such that fresh water condenses from the moist air producing a dehumidifier dry air and hot liquid heat transfer media.

2. The apparatus of claim 1, wherein the flow rates of air, liquid heat transfer media, and the water in the humidifier section are adjusted to completely evaporate the water.

3. The apparatus of claim 1, wherein each of the humidifier section and the dehumidifier section comprise multiple stages, and the flow rates of air, liquid heat transfer media, and the water are adjustable in each stage.

4. The apparatus of claim 1, wherein the heater is a solar thermal collector.

5. The apparatus of claim 1, further comprising a liquid heat transfer media cooler that further cools the cool liquid heat transfer media prior to the cool liquid heat transfer media contacting the moist air in the dehumidifier section.

6. The apparatus of claim 1, wherein the hot liquid heat transfer media flows downward over the at least one first porous sheet in the humidifier section under the force of gravity, and the cool liquid heat transfer media flows downward over the at least one second porous sheet in the dehumidifier section under the force of gravity.

7. The apparatus of claim 6, wherein the at least one first porous sheet and the at least one second porous sheet each comprise a hydrophilic layer and a hydrophobic layer.

8. The apparatus of claim 1, further comprising a heat exchanger for preheating the water prior to the water entering the humidifier section using the fresh water condensed from the dehumidifier section.

9. The apparatus of claim 1, wherein the hot liquid heat transfer media is recirculated back to the heater.

10. The apparatus of claim 1, wherein the dehumidifier dry air is recirculated back to the humidifier.

11. A method for removing dissolved solids from water, the method comprising:
 heating a liquid heat transfer media that is immiscible with water;
 distributing the heated liquid heat transfer media to one or more first porous sheets in a humidifier such that the heated liquid heat transfer media flows downward under the force of gravity;
 distributing the water containing dissolved solids to the one or more first porous sheets in the humidifier;
 flowing dry air past the one or more first porous sheets in the humidifier such that the water evaporates into the dry air thereby producing moist air, a cool liquid heat transfer media, and separated solids that drop to the bottom of the humidifier;
 distributing the cool liquid heat transfer media to one or more second porous sheets in a dehumidifier such that the cool liquid heat transfer media flows downward under the force of gravity;
 flowing moist air past the one or more second porous sheets in the dehumidifier thereby producing dry air, hot liquid heat transfer media and fresh water.

12. The method of claim 11, further comprising preheating the water distributed to the one or more first porous sheets in the humidifier with the fresh water produced in the dehumidifier by way of a counter flow heat exchanger.

13. The method of claim 11, further comprising further cooling the cool liquid heat transfer media through use of a liquid heat transfer media cooler.

14. The method of claim 11, wherein heating the liquid heat transfer media comprises circulating the liquid heat transfer media through a solar collector.

15. The method of claim 11, further comprising adjusting the flow rates of the liquid heat transfer media and the water in the humidifier so that the water is completely evaporated.

16. The method of claim 11, further comprising adjusting the flow rates of the water and the air in each of multiple stages of the humidifier to balance an enthalpy variation resulting from the change in humidity of the air and temperature of the liquid heat transfer media.

17. An apparatus comprising:
 a heater for heating a liquid heat transfer media that is immiscible with water;
 a humidifier section comprising a plurality of humidification stages, each of the plurality of humidification stages having one or more first porous sheets for allowing direct contact between the heated liquid heat transfer media and water introduced into the humidifier section, the flow rates of the liquid heat transfer media and dry air flowing past the one or more first porous sheets in each of the plurality of humidification stages adjusted to balance enthalpy variation of the liquid heat transfer media and the dry air, thereby producing moist air, cool liquid heat transfer media, and separated solids;
 a dehumidifier section comprising a plurality of dehumidification stages, each of the plurality of dehumidification stages having one or more second porous sheets for allowing direct contact between the cool liquid heat transfer media and the moist air flowing past the at least one second porous sheet in the plurality of dehumidification stages, the flow rates of the liquid heat transfer media and the moist air flowing past the one or more second porous sheet in each of the plurality of dehumidification stages adjusted to balance the enthalpy variation of the liquid heat transfer media and the moist air, thereby condensing fresh water from the moist air and producing drier air and hot liquid heat transfer media.

18. The apparatus of claim 17, wherein the flow rates of the liquid heat transfer media and the water in the humidifier section are adjusted to completely evaporate the water.

19. The apparatus of claim 17, wherein the at least one first porous sheet and the at least one second porous sheet each comprise a hydrophilic layer and a hydrophobic layer.

20. The apparatus of claim 19, wherein the hydrophilic layer comprises cellulose tissue and the hydrophobic layer comprises high-density polyethylene.

* * * * *